(12) United States Patent
Vaquero Avilés-Casco et al.

(10) Patent No.: US 11,322,157 B2
(45) Date of Patent: May 3, 2022

(54) VOICE USER INTERFACE

(71) Applicant: Cirrus Logic International Semiconductor Ltd., Edinburgh (GB)

(72) Inventors: Carlos Vaquero Avilés-Casco, Madrid (ES); David Martínez González, Saragossa (ES); Ryan Roberts, Hertfordshire (GB)

(73) Assignee: Cirrus Logic, Inc., Austin, TX (US)

( * ) Notice: Subject to any disclaimer, the term of this patent is extended or adjusted under 35 U.S.C. 154(b) by 136 days.

(21) Appl. No.: 16/315,277

(22) PCT Filed: Jun. 6, 2017

(86) PCT No.: PCT/GB2017/051621
§ 371 (c)(1),
(2) Date: Jan. 4, 2019

(87) PCT Pub. No.: WO2017/212235
PCT Pub. Date: Dec. 14, 2017

(65) Prior Publication Data
US 2019/0214022 A1    Jul. 11, 2019

Related U.S. Application Data

(60) Provisional application No. 62/486,625, filed on Apr. 18, 2017, provisional application No. 62/429,196, (Continued)

(51) Int. Cl.
*G10L 17/22* (2013.01)
*G06F 21/32* (2013.01)
(Continued)

(52) U.S. Cl.
CPC .............. *G10L 17/22* (2013.01); *G06F 21/32* (2013.01); *G10L 17/00* (2013.01); *G10L 17/02* (2013.01);
(Continued)

(58) Field of Classification Search
CPC ......... G10L 17/22; G10L 17/00; G10L 17/02; G10L 17/04; G10L 2015/088; G06F 21/32
See application file for complete search history.

(56) References Cited

U.S. PATENT DOCUMENTS 7,039,951 B1    5/2006 Chaudhari et al.
2005/0063522 A1*  3/2005 Kim ........................ G10L 17/00
                                                            379/88.02
(Continued)

FOREIGN PATENT DOCUMENTS

KR    10-2014-0139982 A    12/2014
WO          03098373 A1    11/2003
(Continued)

OTHER PUBLICATIONS

International Search Report and Written Opinion of the International Searching Authority, International Application No. PCT/GB2017/051621, dated Oct. 13, 2017.
(Continued)

*Primary Examiner* — Michelle M Koeth
(74) *Attorney, Agent, or Firm* — Jackson Walker L.L.P.

(57) ABSTRACT

A method of speaker authentication comprises: receiving a speech signal; dividing the speech signal into segments; and, following each segment, obtaining an authentication score based on said segment and previously received segments, wherein the authentication score represents a probability that the speech signal comes from a specific registered speaker. In response to an authentication request, an authentication result is output based on the authentication score.

19 Claims, 6 Drawing Sheets

Related U.S. Application Data filed on Dec. 2, 2016, provisional application No. 62/418,453, filed on Nov. 7, 2016, provisional application No. 62/346,036, filed on Jun. 6, 2016.

(51) Int. Cl.
　　*G10L 17/00*　　(2013.01)
　　*G10L 17/02*　　(2013.01)
　　*G10L 17/04*　　(2013.01)
　　*G10L 15/08*　　(2006.01)

(52) U.S. Cl.
　　CPC ........ *G10L 17/04* (2013.01); *G10L 2015/088* (2013.01)

(56) References Cited

U.S. PATENT DOCUMENTS

| | | |
|---|---|---|
| 2008/0255842 A1 | 10/2008 | Simhi |
| 2010/0204993 A1 | 8/2010 | Vogt |
| 2013/0080167 A1 | 3/2013 | Mozer |
| 2014/0249817 A1 * | 9/2014 | Hart .................. G10L 15/22 704/239 |
| 2015/0301796 A1 * | 10/2015 | Visser ............... G10L 15/22 715/728 |
| 2017/0324736 A1 * | 11/2017 | Connell, II ........ G06F 21/32 |

FOREIGN PATENT DOCUMENTS

| | | | |
|---|---|---|---|
| WO | WO-03098373 A2 * | 11/2003 | ........ G10L 17/24 |
| WO | 2008047339 A2 | 4/2008 | |

OTHER PUBLICATIONS

Vogt, Robbie et al., "Minimising Speaker Verification Utterance Length through Confidence Based Early Verification Decisions", Jun. 2, 2009, Advances in Biometrics, Springer Berlin Heidelberg, pp. 454-463.

Combined Search and Examination Report under Sections 17 and 18(3), UKIPO, Application No. GB1708954.1, dated Nov. 1, 2017.

Notice of Preliminary Rejection, KIPO, Application No. KR 10-2019-7000174, dated Jun. 28, 2021.

* cited by examiner

VOICE USER INTERFACE

TECHNICAL FIELD

The embodiments described herein relate to a method and system for use in a voice user interface, for example for allowing a user to control the operation of a device using speech.

BACKGROUND OF THE INVENTION

Voice user interfaces are provided to allow a user to interact with a system using their voice. One advantage of this, for example in devices such as smartphones, tablet computers and the like, is that it allows the user to operate the device in a hands-free manner.

In one typical system, the user wakes the voice user interface from a low-power standby mode by speaking a trigger phrase. Speech recognition techniques are used to detect that the trigger phrase has been spoken and, separately, a speaker recognition process is used to confirm that the trigger phrase was spoken by a registered user of the device.

The voice user interface may then provide a prompt to the user, to confirm that the system is active, and the user may then speak a command, which can be recognised by the voice user interface using speech recognition techniques.

The voice user interface may then act on that spoken command. For example, if the spoken command asks for publicly available information, the spoken command may be recognised, and used to generate a query to an internet search engine in order to be able to supply that information to the user.

However, in other cases, for example if the spoken command relates to personal information, the level of authentication provided by the speaker recognition process may be considered insufficient for the voice user interface to act on that command. In such cases, the user may be asked to provide an additional form of authentication, for example by entering a PIN number or password through a keypad of the device, or by providing additional biometric authentication, such as a fingerprint scan.

This means that the user is no longer able to operate the device in a hands-free manner.

SUMMARY OF THE INVENTION

According to the embodiments described herein, there is provided a method and a system which reduce or avoid one or more of the disadvantages mentioned above.

According to a first aspect of the invention, there is provided a method of speaker authentication, comprising:
  receiving a speech signal;
  dividing the speech signal into segments;
  following each segment, obtaining an authentication score based on said segment and previously received segments, wherein the authentication score represents a probability that the speech signal comes from a specific registered speaker; and
  outputting an authentication result based on the authentication score in response to an authentication request.

The authentication score may be obtained by comparing features of the speech signal with a model generated during enrolment of the registered speaker.

The speech signal may represent multiple discrete sections of speech.

The first segment may represent a trigger phrase. The method may then comprise performing the steps of obtaining the authentication score and outputting the authentication result in response to detecting that the trigger phrase has been spoken.

The method may comprise, after the trigger phrase, dividing the speech signal into segments of equal lengths. For example, the method may comprise, after the trigger phrase, dividing the speech signal into segments covering equal length periods of time, or may comprise, after the trigger phrase, dividing the speech signal into segments comprising equal durations of net speech.

The method may comprise comparing the authentication score with a first threshold score, and determining a positive authentication result if the authentication score exceeds the first threshold score.

The first threshold score may be set in response to a signal received from a separate process.

The method may comprise receiving the signal from the separate process, and selecting the first threshold score from a plurality of available threshold scores.

The signal received from the separate process may indicate a requested level of security.

The separate process may be a speech recognition process.

The method may comprise comparing the authentication score with a second threshold score, and determining a negative authentication result if the authentication score is below the second threshold score.

The second threshold score may be set in response to a signal received from a separate process.

The method may comprise receiving the signal from the separate process, and selecting the second threshold score from a plurality of available threshold scores.

The signal received from the separate process may indicate a requested level of security.

The separate process may be a speech recognition process.

The method may comprise initiating the method in response to determining that a trigger phrase has been spoken.

The method may comprise receiving the authentication request from a speech recognition process.

The authentication request may request that the authentication result be output when the authentication score exceeds a threshold, or may request that the authentication result be output when the speech signal ends.

The step of, following each segment, obtaining an authentication score based on said segment and previously received segments may comprise:
  obtaining a first authentication score based on a first segment;
  obtaining a respective subsequent authentication score based on each subsequent segment; and
  obtaining the authentication score based on said segment and previously received segments by merging the first authentication score and the or each subsequent authentication score.

The step of merging the first authentication score and the or each subsequent authentication score may comprise forming a weighted sum of the first authentication score and the or each subsequent authentication score.

The method may comprise forming the weighted sum of the first authentication score and the or each subsequent authentication score by applying weights that depend on respective signal-to-noise ratios applicable to the respective segments, or by applying weights that depend on quantities of speech present in the respective segments.

The method may comprise forming the weighted sum of the first authentication score and the or each subsequent authentication score by disregarding some or all outlier scores. For example, the method may comprise forming the weighted sum of the first authentication score and the or each subsequent authentication score by disregarding low outlier scores while retaining high outlier scores.

The step of, following each segment, obtaining an authentication score based on said segment and previously received segments may comprise:
  obtaining a first authentication score based on a first segment of the speech signal; and
  following each new segment of the speech signal, combining the new segment of the speech signal with the or each previously received segment of the speech signal to form a new combined speech signal; and
  obtaining an authentication score based on said new combined speech signal.

The step of, following each segment, obtaining an authentication score based on said segment and previously received segments may comprise:
  extracting features from each segment;
  obtaining a first authentication score based on the extracted features of a first segment of the speech signal; and
  following each new segment of the speech signal, combining the extracted features of the new segment of the speech signal with the extracted features of the or each previously received segment of the speech signal; and
  obtaining an authentication score based on said combined extracted features.

The method may comprise after determining a positive authentication result:
  starting a timer that runs for a predetermined period of time; and
  treating the specific registered speaker as authenticated for as long as the timer is running.

The method may comprise restarting the timer if a new positive authentication result is determined while the timer is running.

According to an aspect of the invention, there is provided a device for processing a received signal representing a user's speech, for performing speaker recognition, wherein the device is configured to:
  receive a speech signal;
  divide the speech signal into segments;
  following each segment, obtain an authentication score based on said segment and previously received segments, wherein the authentication score represents a probability that the speech signal comes from a specific registered speaker; and
  output an authentication result based on the authentication score in response to an authentication request.

The device may comprise a mobile telephone, an audio player, a video player, a mobile computing platform, a games device, a remote controller device, a toy, a machine, or a home automation controller or a domestic appliance.

The device may be further configured for performing speech recognition on at least a portion of the received signal.

The device may be further configured for transferring at least a portion of the received signal to a remote device for speech recognition, in which case the device may be further configured for receiving a result of the speech recognition.

According to an aspect of the invention, there is provided an integrated circuit device for processing a received signal representing a user's speech, for performing speaker recognition, wherein the integrated circuit device is configured to:
  receive a speech signal;
  divide the speech signal into segments;
  following each segment, obtain an authentication score based on said segment and previously received segments, wherein the authentication score represents a probability that the speech signal comes from a specific registered speaker; and
  output an authentication result based on the authentication score in response to an authentication request.

The authentication score may be obtained using at least one user or background model stored in said device.

The invention also provides a non-transitory computer readable storage medium having computer-executable instructions stored thereon that, when executed by processor circuitry, cause the processor circuitry to perform any of the methods set out above.

BRIEF DESCRIPTION OF THE DRAWINGS

For a better understanding of the invention, and to show more clearly how it may be carried into effect, reference will now be made, by way of example only, to the accompanying drawings in which.

DETAILED DESCRIPTION

For clarity, it will be noted here that this description refers to speaker recognition and to speech recognition, which are intended to have different meanings. Speaker recognition refers to a technique that provides information about the identity of a person speaking. For example, speaker recognition may determine the identity of a speaker, from amongst a group of previously registered individuals, or may provide information indicating whether a speaker is or is not a particular individual, for the purposes of identification or authentication. Speech recognition refers to a technique for determining the content and/or the meaning of what is spoken, rather than recognising the person speaking.

Figure 1:
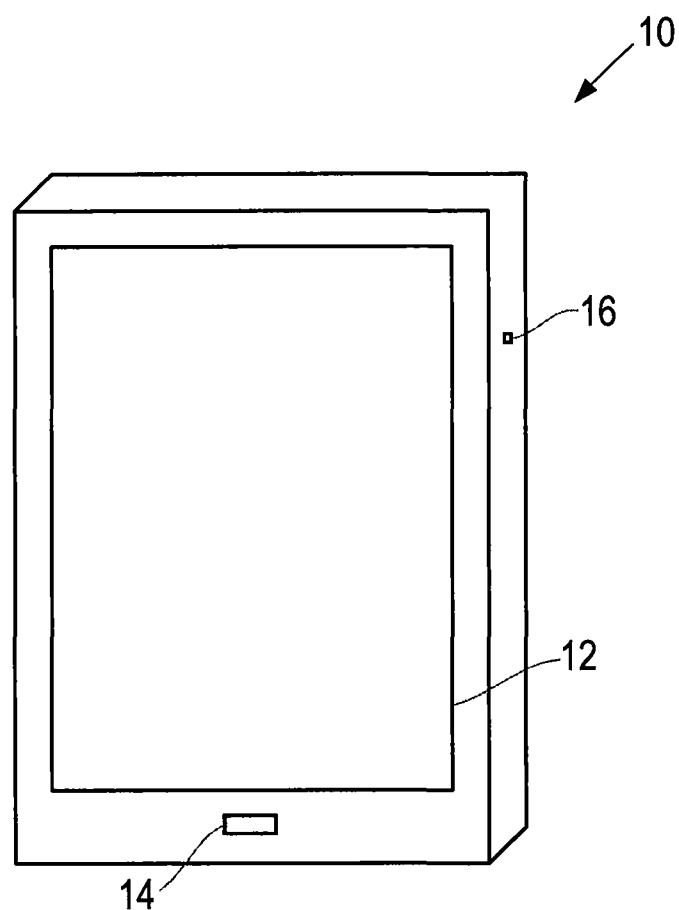
FIG. 1 is a schematic view of an electronic device.

FIG. 1 shows a device in accordance with one aspect of the invention. The device may be any suitable type of device, such as a mobile computing device for example a laptop or tablet computer, a games console, a remote control device, a home automation controller or a domestic appliance including a domestic temperature or lighting control system, a toy, a machine such as a robot, an audio player, a video player, or the like, but in this illustrative example the device is a mobile telephone, and specifically a smartphone 10. The smartphone 10 may, by suitable software, be used as the control interface for controlling any other further device or system.

The smartphone 10 includes a screen 12 for displaying information to a user, a sound inlet 14, for allowing sound to be detected by a microphone, and a jack socket 16, or other port or receptacle, for allowing an accessory to be connected to the device.

Figure 2:
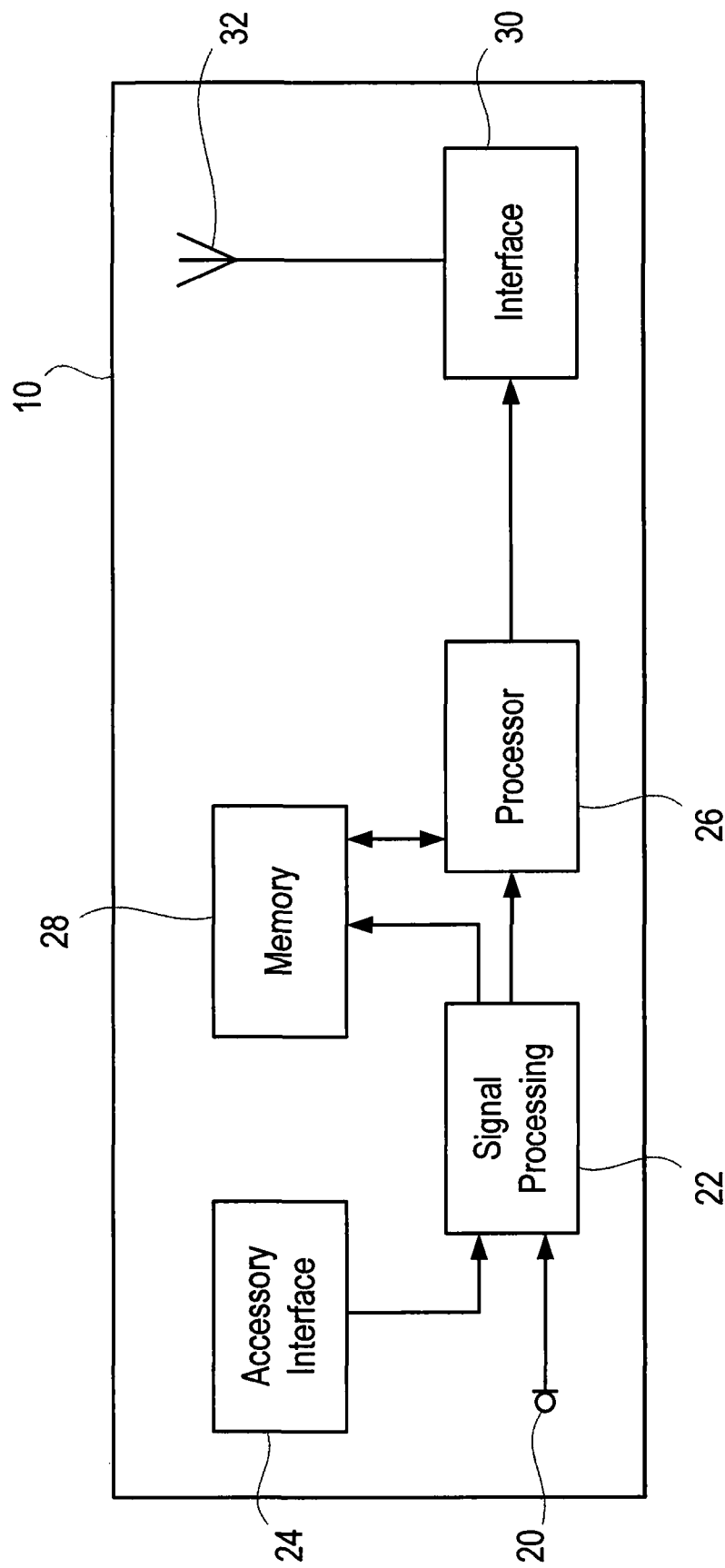
FIG. 2 is a further schematic diagram of an electronic device.

FIG. 2 is a schematic diagram showing the smartphone 10. In this example, the smartphone 10 includes a microphone 20, which may for example be located close to the sound inlet 14 shown in FIG. 1. Electronic signals generated by the microphone 20 are passed to a signal processing block 22, which performs initial signal processing of the signals, for example converting analog signals received from the microphone 20 into digital signals.

The smartphone 10 also includes an accessory interface 24, which may for example be located close to the jack socket 16 shown in FIG. 1. The jack socket 16 and the interface 24 may be suitable for allowing a headset accessory to be connected thereto, and signals received from a microphone on such an accessory are also passed to the signal processing block 22, which performs initial signal processing of the signals.

The signal processing block 22 is connected to a processor 26, which performs methods as described herein on the basis of data and program instructions stored in a memory 28. Specifically, the methods described herein can be performed on the processor 26 by executing instructions that are stored in non-transient form in the memory 28, with the program instructions being stored either during manufacture of the device 10 or by upload while the device 10 is in use.

The processor 26 is connected to an interface 30, which is itself connected to an antenna 32, allowing signals to be transmitted and received over an external network to remote devices.

In other examples, the device performing the processes described herein may receive the required input signals in a suitable form, without needing to perform any prior signal detection or signal processing and thus not requiring the device to comprise signal processing block 22.

In some examples, some of the processing described below may be performed on an external device communicated with via an external network, for example a remote computing server or a server in a home network. In other examples, all of the processing described below may be performed in a single device, without requiring the device to comprise any interface to any external device or network.

Figure 3:
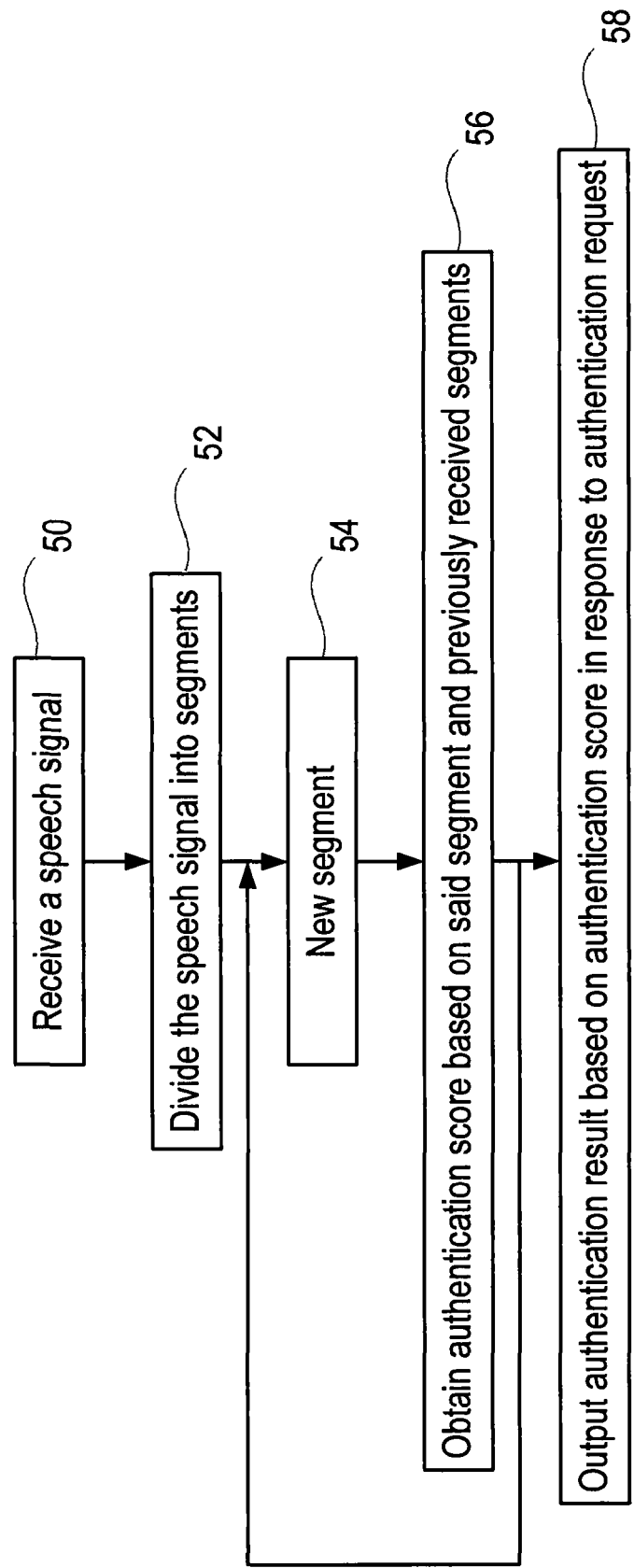
FIG. 3 is a flow chart, illustrating a method.

FIG. 3 is a flow chart, illustrating a method of operation of a voice user interface according to one embodiment.

As described in more detail below, the process shown in FIG. 3 is performed after a user has registered with the system, for example by providing one or more sets of voice samples that can be used to form one or more model of the user's speech. Typically, the registration or enrolment process requires the user to provide speech inputs, and then uses these speech inputs to form a model of the user's speech, starting from a particular background model defined in a prior development phase. Thus, the background model and the speech inputs are the inputs to the enrolment process that is used to form the model of the user's speech. Subsequently, during verification, as described in more detail below, further speech inputs are compared with the model of the user's speech, and with a background model, in order to provide an output. An output of this comparison may for example be a numerical value indicating a likelihood that the speech inputs received during the verification phase were provided by the same user that provided the speech inputs during enrolment. The numerical value indicative of the likelihood may be for example a log likelihood ratio (LLR) or may be some more indirect indication, for example a metric of distance of extracted features of the speech sample from some one- or multi-dimensional threshold.

The voice user interface may spend the majority of its time in a standby state, in order to save power. A voice activity detection block may be provided, for determining when sounds that are detected by a microphone represent speech. In some embodiments, signals that are received from a microphone are stored. Then, when the voice activity block determines that the sounds that are detected by the microphone represent speech, those stored signals are analysed as described below.

The signal that is determined to represent speech may be sent to a speech recognition block, to determine the content of the speech. The method set out below may be initiated in response to determining that a predetermined trigger phrase has been spoken.

In step 50, the voice user interface receives the speech signal. The speech signal may for example result from an interaction with a virtual assistant. For example, in one typical interaction, a user may first speak a trigger phrase to wake the virtual assistant, and may then speak an initial query, in response to which the virtual assistant provides some information, and the user then speaks a further command. The speech signal may therefore represent multiple discrete sections of speech. In other cases, the speech signal may represent continual speech from the user.

In step 52, the received speech signal is divided into segments. This division may take place as the speech signal is being received.

For example, when the speech signal contains a trigger phrase, plus one or more subsequent spoken commands or queries, the trigger phrase may be treated as the first segment.

The part of the speech signal after the trigger phrase may be divided into segments of equal lengths. More specifically, the part of the speech signal after the trigger phrase may be divided into segments covering equal length periods of time. Alternatively, the part of the speech signal after the trigger phrase may be divided into segments comprising equal durations of net speech.

That is, the speech signal may cover a period of several seconds. In some cases, the user will be speaking for the whole of that period. In other cases, there will be periods when the virtual assistant is providing an output, and there will be periods of silence. In such cases, the part of the speech signal after the trigger phrase may be divided into segments covering equal length periods of time (for example 1 second), even though different segments will contain different amounts of the user's speech. Alternatively, the part of the speech signal after the trigger phrase may be divided into segments comprising equal durations of the user's speech, even though the segments may then cover different durations.

In step 54, it is recognised that a speech segment has been completed. For example, this may be when one of the equal length periods of time has expired, or when a predetermined duration of the user's speech has been received.

In step 56, an authentication score is obtained, based on the newly completed speech segment and on previously received segments. The authentication score represents a probability that the speech signal comes from a specific registered speaker.

In step 58, in response to an authentication request, an authentication result is output, based on the authentication score. The authentication request may for example be received from a speech recognition process.

The authentication result may be generated by comparing the authentication score with a threshold score, and determining a positive authentication result if the authentication score exceeds the threshold score. The threshold score may be set according to a received requested level of security. For example, the system may receive a signal from an external system, and may then select the threshold score from a plurality of available threshold scores in response to said requested level of security. The requested level of security may be received from a speech recognition process.

Thus, for example, the speech signal may be sent to a speech recognition system, which determines the content and meaning of the user's speech. The threshold score may then be determined based on a content of the speech. For example, the threshold score may be selected from a plurality of available threshold scores in response to the content of the speech.

For example, when the speech recognition system recognises that the user's speech contains a command, the command may be executed only if a positive authentication result is obtained. If the command is a request for information, for example a request for information about flight times between two cities, then a low threshold score may be set, because the consequences of a mistaken decision to accept the speech as being from the enrolled user are not serious. However, if the command is a request to supply personal information, or a request to authorise a financial transaction, for example, then the consequences of a mistaken decision to accept the speech as being from the enrolled user are much more serious, and so a high threshold score may be set, so that a positive authentication result is output only if the system has a high degree of certainty that the speech signal does represent the speech of the enrolled user.

As mentioned above, the authentication result is output in response to an authentication request. The authentication request may request that the authentication result be output when the authentication score exceeds the threshold score. This may be subject to a time-out, so that the user is rejected and the process ends if the user cannot be authenticated within a predetermined time limit.

Alternatively, the authentication request may request that the authentication result be output immediately.

Alternatively, the authentication request may request that the authentication result be output at some future time, for example when the speech signal ends.

If, after step 56, it is determined that there is no need to output an authentication result, for example, because the authentication score does not yet exceed the threshold score and the speech signal has not yet ended, then the process may return to step 54.

Step 56, which comprises, following each segment, obtaining an authentication score based on said segment and previously received segments, may then comprise: obtaining a first authentication score based on a first segment; obtaining a respective subsequent authentication score based on each subsequent segment; and obtaining the authentication score based on said segment and previously received segments by merging the first authentication score and the or each subsequent authentication score.

Thus, a separate score is obtained for each segment, and the separate scores are merged. For example, the step of merging the first authentication score and the or each subsequent authentication score may comprise forming a weighted sum of the first authentication score and the or each subsequent authentication score. The weighted sum may give different weights to the scores from the different segments based for example on the signal/noise ratios in the respective segments, or on the amounts of the user's speech in the respective segments, or on other factors.

This process of weighting the scores may also be used to remove the effect of clear outliers, where the score for one segment is very clearly different from the scores obtained for the segments processed previously. For example, all outliers may be given zero weight, i.e. effectively discarded when merging the authentication scores. Alternatively, high authentication scores (i.e. representing a positive authentication decision) may be retained, while outlier low authentication scores may be given zero weight, i.e. effectively discarded when merging the authentication scores. In this case it should be noted that, for example in the case of a change of speaker, a low authentication score may be obtained for one segment, and this may initially be regarded as an outlier and disregarded, but may subsequently be regarded as a typical score and would then be taken fully into account.

Alternatively, a median filter could be applied to the authentication scores to provide stability to the updated score.

Alternatively, step 56, which comprises, following each segment, obtaining an authentication score based on said segment and previously received segments, may then comprise: obtaining a first authentication score based on a first segment of the speech signal; and, following each new segment of the speech signal, combining the new segment of the speech signal with the or each previously received segment of the speech signal to form a new combined speech signal; and obtaining an authentication score based on said new combined speech signal.

Thus, a score is obtained for the first segment but, after each new segment, there is not a separate score for that new segment, but only a new score for the whole of the signal to date.

As a further alternative, a first score may be obtained for one or more first segment. Then a separate second score may be obtained for one or more second segment. The first and second scores may then be merged to obtain the overall authentication score. This alternative may for example be useful in a situation in which the first segment of speech is a trigger phrase, while the second segments represent a spoken command. Because the trigger phrase is known in advance, it is possible for the system to be trained by the user speaking that known trigger phrase, allowing text-dependent speaker recognition techniques to be used to obtain the first authentication score. However, there will potentially be a large number of possible commands, making it impractical for the system to be trained by the user speaking those commands. Thus, text-independent speaker recognition techniques will need to be used to obtain the separate second authentication score.

Figure 4:
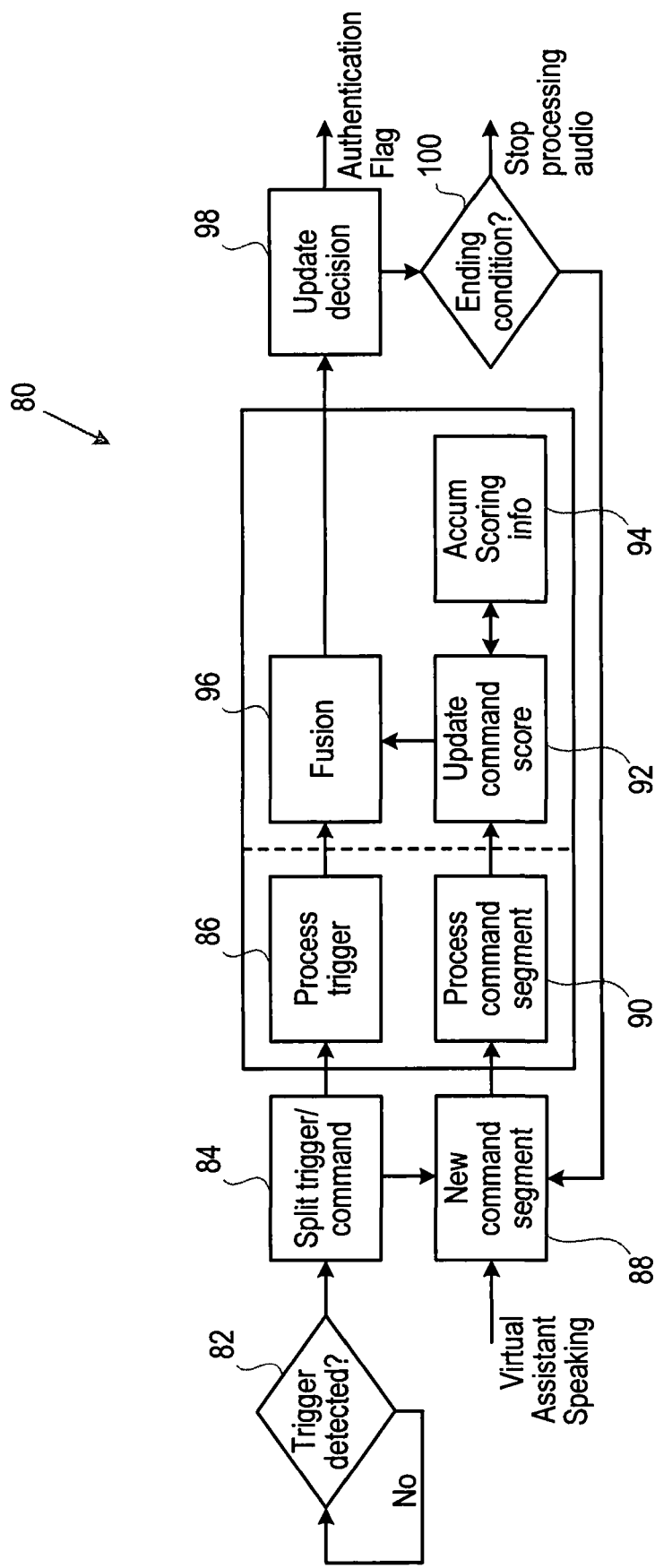
FIG. 4 is a block diagram, illustrating a processing system.

FIG. 4 is a block diagram, illustrating a general form of a speaker recognition system 80, for use in a virtual assistant system, in one embodiment. The functions illustrated in FIG. 4 may be performed in a processor 26 of a smartphone 10, as shown in FIG. 2, or they may be performed in a separate system, for example in a cloud computing environment. In general, computationally-intensive tasks may advantageously be performed remotely in order to save power in the portable device, and similarly tasks that would impose impractical data storage requirements on a portable device may be performed remotely, while less computationally-intensive tasks, and tasks involving private data may advantageously be performed in the user's smartphone. For example, speech recognition may be performed remotely, while speaker recognition is performed in the smartphone itself, though many different assignments of the tasks can be devised.

In this example, it is assumed that a user has enrolled with the system by providing spoken inputs to the system, in order to train the system, during the enrolment phase. This further description then relates to the verification phase, during which it is determined whether a speaker can be taken to be the enrolled user.

In this example, the system 80 comprises a block 82 for determining whether a trigger phrase has been detected. This block will typically contain a buffer that will be continually storing the most recently received part of the speech signal. The buffer should in this case be long enough to store speech of at least the duration of the expected trigger phrase. Then, when the block 82 determines that the trigger phrase has been spoken, without making any determination as to whether it was spoken by the enrolled user, the block 82 sends a signal to a split trigger/command block 84. This signal is extracted from the buffer, and contains the part of the stored speech signal that includes the stored trigger phrase.

The detection of the trigger phrase can use a voice activity detector (VAD) and/or a speech recognition process.

In this illustrated example, it is assumed that the user's speech contains a trigger phrase (for example "OK phone", or the like), followed by a command. The split trigger/command block 84 determines when the trigger phrase has ended and the command is about to start.

The start of the command can be identified simply by considering everything that follows the known trigger to be part of the command. Alternatively, a speech recognition process can be used to determine that the user has started an utterance after the trigger.

The split trigger/command block 84 sends that portion of the speech signal that represents the trigger phrase to the process trigger block 86, which performs a speaker recognition process on the trigger phrase. Because the trigger phrase is known in advance, it is possible for the speaker recognition system to be trained during enrolment by the user speaking that known trigger phrase. This allows text-dependent or text-constrained speaker recognition techniques to be used by the process trigger block 86 during the verification phase in order to obtain a first authentication score. The first authentication score indicates a likelihood that the speech inputs received during the verification phase were provided by the same user that provided the speech inputs during enrolment.

An antispoofing method, which attempts to detect attacks such as replayed recordings of an enrolled user or malware attacks, can be included in the process trigger block 86 in order to provide information on the robustness of the first authentication score.

The split trigger/command block 84 then streams the portion of the input speech signal that represents the command phrase to the new command segment block 88.

Although the system has been described so far with reference to the use of a trigger phrase, it should be noted that, in other examples, there may be no trigger phrase, and the system may be activated by some other action of the user, such as pressing a button or performing some other form of authentication. In that case, the whole of the speech signal is passed to the new command segment block 88.

The new command segment block 88 also receives information indicating when the virtual assistant is speaking. For example a virtual assistant may speak to a user in response to a command in order to elicit further information from the user, and so the user's speech may in that case be interrupted by the virtual assistant speaking.

The new command segment block 88 divides the received speech signal into segments of the user's speech, omitting any speech generated by the virtual assistant.

In this example, the user's speech after the trigger phrase is divided into segments of equal lengths. More specifically, in this example, the part of the speech signal after the trigger phrase is divided into segments covering equal length periods of time, for example 1 second. As mentioned above, the new command segment block 88 may divide the received speech signal after the trigger phrase into segments covering equal length periods of time, or into segments comprising equal durations of net speech, for example.

Immediately it is completely received, each new segment of the command is passed to a process command segment block 90. This block performs speaker recognition on the content of the command. Typically, the process of speaker recognition involves extracting relevant features of the speech signal, for example Mel Frequency Cepstral Coefficients (MFCCs), and using these features as the basis for a statistical speaker recognition process.

When the first segment of the command is received, it is processed by the voice biometrics system in the block 90, in order to obtain a score that represents the probability that the speaker is the previously enrolled speaker. This score is stored in the update command score block 92.

The voice biometrics system in the block 90 will in general be a text-independent or unconstrained system, because it will in general not be known in advance what the user will say. The speaker recognition processing performed in the block 90 could be exactly the same as the system used for processing the trigger phrase in the block 86, or it could share some aspects of that system (for example it could use the same algorithm but use different background models), or it could be completely different.

When the first segment of the command has been processed, some information relating to that segment is extracted.

The information that is extracted is stored in the accumulated scoring information block 94.

In one example, this information comprises only the authentication score for the first segment. Then, when the second segment of the command is received, it is processed by the voice biometrics block 90 completely independently of the first, in order to obtain an authentication score for the second segment.

The update command score block 92 then combines the scores from the first and second segments to obtain an updated score for the command. For example, the combination may be a weighted sum of the individual scores. As one example of this, the scores may be weighted by the duration of the user's speech in each segment. For example, if the first segment contains 600 milliseconds of the user's speech and the second segment contains 300 milliseconds of the user's speech, then the score of the first segment may be given double the weighting of the second segment in the combined score.

In order to allow this weighting to be used, the information that is stored in the accumulated scoring information block 94 includes the duration of the user's speech taken into account in calculating the relevant score.

Then, when the third segment of the command is received, it is also processed by the voice biometrics block 90 completely independently of the first and second segments, in order to obtain an authentication score for the third segment.

The update command score block 92 then combines the score from the third segment with the combined score for the first and second segments to obtain an updated score for the command. Again, the combination may be a weighted sum of the individual scores, and the scores may be weighted by the duration of the user's speech used in forming each score.

Further techniques for fusing the scores obtained on the different segments are discussed below, with reference to the fusion block 96. For example, the weightings given to the authentication scores can depend on some quality measure associated with each segment, such as a respective signal to noise ratio measured during the segment.

As another example, the information that is stored in the accumulated scoring information block 94 may comprise the whole of the audio signal that is received in the command.

In that case, when a new command segment is received, the process command segment block 90 may perform a new authentication process on the whole of the command audio, including the newly received segment. The update command score block 92 then replaces the previously obtained authentication score by the newly calculated authentication score.

As a further example, the information that is stored in the accumulated scoring information block 94 may comprise the extracted relevant features of the speech signal, such as the MFCCs mentioned previously.

In that case, when a new command segment is received, the process command segment block 90 may perform a new authentication process on the features extracted from the whole of the command audio, including the newly received segment. The update command score block 92 then replaces the previously obtained authentication score by the newly calculated authentication score.

Each time that the authentication score for the command is updated by the update command score block 92, a fusion block 96 calculates a new authentication score, based on the outputs of the process trigger block 86 and the update command score block 92.

In this example, the fusion block 96 thus combines the results of the speaker recognition processes performed on the trigger and the command, in order to obtain a combined authentication score indicating a likelihood that the user is the enrolled user. The combined authentication score indicative of the likelihood may be for example a log likelihood ratio (LLR) or may be some more indirect indication, for example a metric of distance of extracted features of the speech sample from some one- or multi-dimensional threshold or nominal point or volume in a multi-dimensional speech parameter space.

The combined authentication score may be obtained from the separate authentication scores, i.e. the results of the speaker recognition processes performed on the trigger and the command by any suitable method. For example, the combined authentication score may be a weighted sum $s_F$ of the authentication scores $s_T$ and $s_C$ obtained from the trigger and the command respectively. That is, in general terms:

$$s_F = \alpha s_T + \beta s_C + \gamma$$

The weighting factors $\alpha$, $\beta$, and $\gamma$ may be constant and determined in advance.

Alternatively, the step of combining the results of the speaker recognition processes performed on the first and second voice segments, to obtain a combined output authentication score, may use quality measures to determine how the results should be combined, in order to improve the reliability of the decision. That is, separate quality measures are obtained for the trigger and command voice segments, and these quality measures are then used as further inputs to the process by which the authentication scores are combined.

These quality measures may for example be based on properties of the trigger phrase and the command. Certain triggers will be more suitable for use in voice biometrics than others because they are longer in duration, or because they contain more phonetic variability and thus they provide more information to differentiate speakers. Certain commands will be more suitable for use in voice biometrics than others for the same reasons. Other aspects, such as the presence of non-stationary noise in either the first and second voice segments may make one voice segment more reliable than the other.

In one embodiment there is defined a set of quality measures, namely a set of quality measures $Q_T$ for the trigger and a set of quality measures $Q_C$ for the command, and the values of weighting factors $\alpha$, $\beta$, and $\gamma$ are set based on the quality measures. Then a weighted sum $s_F$ will be obtained as a function of these quality measures:

$$s_F = \alpha(Q_T,Q_C)s_T + \beta(Q_T,Q_C)s_C + \gamma(Q_T,Q_C)$$

The functions that map the quality measures $Q_T$, $Q_C$ to the weighting factors $\alpha$, $\beta$, and $\gamma$ are part of the system design and are thus obtained and defined during a development phase, before the system is deployed for user enrolment or verification. The values returned by these functions in use after the development phase will vary from sample to sample as the quality measures $Q_T$, $Q_C$ vary from sample to sample.

The functions may be obtained during the development phase on the basis of exercising the system with a large number of speech samples arranged to have a range of different values of the quality measures.

The form of the functions may be defined before the development phase, and coefficients or optimised to provide the best fit. In some embodiments, the functions may not be algebraic functions but may comprise the form of a look-up table containing optimised coefficients optimised over ranges of value of the quality measures or fixed values applied to optimised ranges of quality measures. More generally a function may be the result of some more complex algorithm characterised by some coefficients and delivering a value dependent on the quality measures.

In some embodiments the combined score may be a non-linear combination of the scores $s_F$ and $s_C$, which may for example be represented in the form $$s_F = \alpha(Q_T,Q_C,s_T)s_T + \beta(Q_T,Q_C,s_C)s_C + \gamma(Q_T,Q_C)$$

where the each weighting factor $\alpha$ or $\beta$ may depend continuously or non-continuously on the respective score.

More generally, the combined score may be any function of the scores, $s_T$ and $s_C$, that are obtained from the speaker recognition processes performed on the first and second voice segments, and of the quality measures, $Q_T$ and $Q_C$, that apply to those voice segments. That is:

$$s_F = f(s_T,s_C,Q_T,Q_C)$$

where f may be any function.

The values of the scores, $s_T$ and $s_C$, and of the quality measures, $Q_T$ and $Q_C$, may be applied to a neural network, which then produces a value for the combined score $s_F$.

When determining the weights to be given to the results of the first and second speaker recognition processes, different quality measures can be considered.

One suitable quality measure is the Signal to Noise Ratio (SNR), which may for example be measured in the input trigger and in the input command separately. In the case of non-stationary noise, where the SNR varies rapidly, a higher weight can be given to the result obtained from the input speech segment that has the higher SNR.

Another suitable quality measure is the net-speech measure. As discussed in connection with the illustrated embodiment, the weight that is given to the score obtained from the command can be increased according to the amount of speech in the command. That is, the total length of the fragments in the command that actually contain speech, excluding non-speech segments, is measured, for example in time units such as seconds, and this is used to form the weight to be applied to the command, relative to the weight applied to the trigger.

The new authentication score generated by the fusion block 96 in response to a new segment of the audio input is transmitted to a decision update block 98, which produces an authentication result. In this example, the authentication result is an authentication flag, having two possible values, namely "user authenticated" and "user not authenticated". The authentication result is obtained by comparing the authentication score with a threshold value. The threshold value may be fixed, or may depend on some variable criterion. For example, the threshold value may be determined by a security level. For a low security system, or a low security command within a system, a relatively high False Acceptance Rate (FAR) may be tolerable, and so a low threshold may be set. In that case, a relatively low authentication score, representing a relatively low degree of confidence that the user is the enrolled user, may still exceed the threshold. For a high security system, or a high security command within a system, a relatively low False Acceptance Rate (FAR) may be required, and so a high threshold may be set, such that only a high authentication score, representing a high degree of confidence that the user is the enrolled user, will exceed the threshold.

An input indicating the required security level may be received from an external process, for example from a speech recognition process determining the content of the user's speech, and so this may be used to set the threshold value. The decision update block 98 may store multiple threshold values, with one of these threshold values being chosen in response to a signal received from the external process, and the authentication result then being obtained by comparing the authentication score with the selected threshold value.

In some embodiments, the authentication score may be compared with multiple threshold values, to give multiple provisional authentication results. In this example, the system may include multiple registers to store corresponding authentication flags, indicating the results of comparing the authentication score with the respective threshold values.

The authentication result may then be output in response to an authentication request.

For example, the authentication flag may be consulted by an external process (for example, the Applications Processor, AP, in a mobile device) when authentication is required, or the authentication result can be pushed up by the decision update block 98 after every segment has been processed, or when the authentication result changes, or when a predefined condition to end the process is satisfied. An authentication request may set the conditions for outputting the authentication result.

The decision update block 98 may therefore set the authentication flag based only on the most recent output of the fusion block 96.

In some examples, the decision update block 98 sets the authentication flag in a manner intended to provide additional stability within the proposed system. In this case, whenever the authentication score is above the relevant threshold, the authentication flag is set to "user authenticated". A timer, referred to as the authentication timer, is started, and runs for a predetermined period of time. The timer is restarted if a new authentication score above the relevant threshold is calculated.

The authentication flag is then maintained in the "user authenticated" state, for the duration of the authentication timer, whatever happens to the authentication score during that period. This guarantees that the user remains authenticated for the duration of the authentication timer, and that silences or extraneous noises that occur after the end of the command do not affect the authentication process. The duration of this timer should be long enough that the authentication flag remains set to "user authenticated" after the end of the command for long enough that an external (possibly remote) speech processing system can interpret the command and can request the authentication flag status over the relevant communication network. However, the duration of the timer should not be set to be so long that other speakers are able to utter command modifications after the command spoken by the enrolled user, and have those command modifications automatically authenticated by default. The timer duration may therefore be as short as a few tens of milliseconds or as long as a few seconds.

After the decision update block 98 has set the authentication flag, an ending condition block 100 determines whether the process should end or continue.

Thus, every time the decision is updated, a set of ending conditions is checked. The process controlling the virtual assistant may indicate that no more command is expected, and thus that the audio process should finish. In response, the processing of the input audio is ended, and the system returns to the state of waiting for a new trigger. This is typically accompanied by an authentication request from the main process requesting the current authentication flag value. Alternatively, the decision update block 98 could at that moment push the current authentication flag value to the main application.

Figure 5:
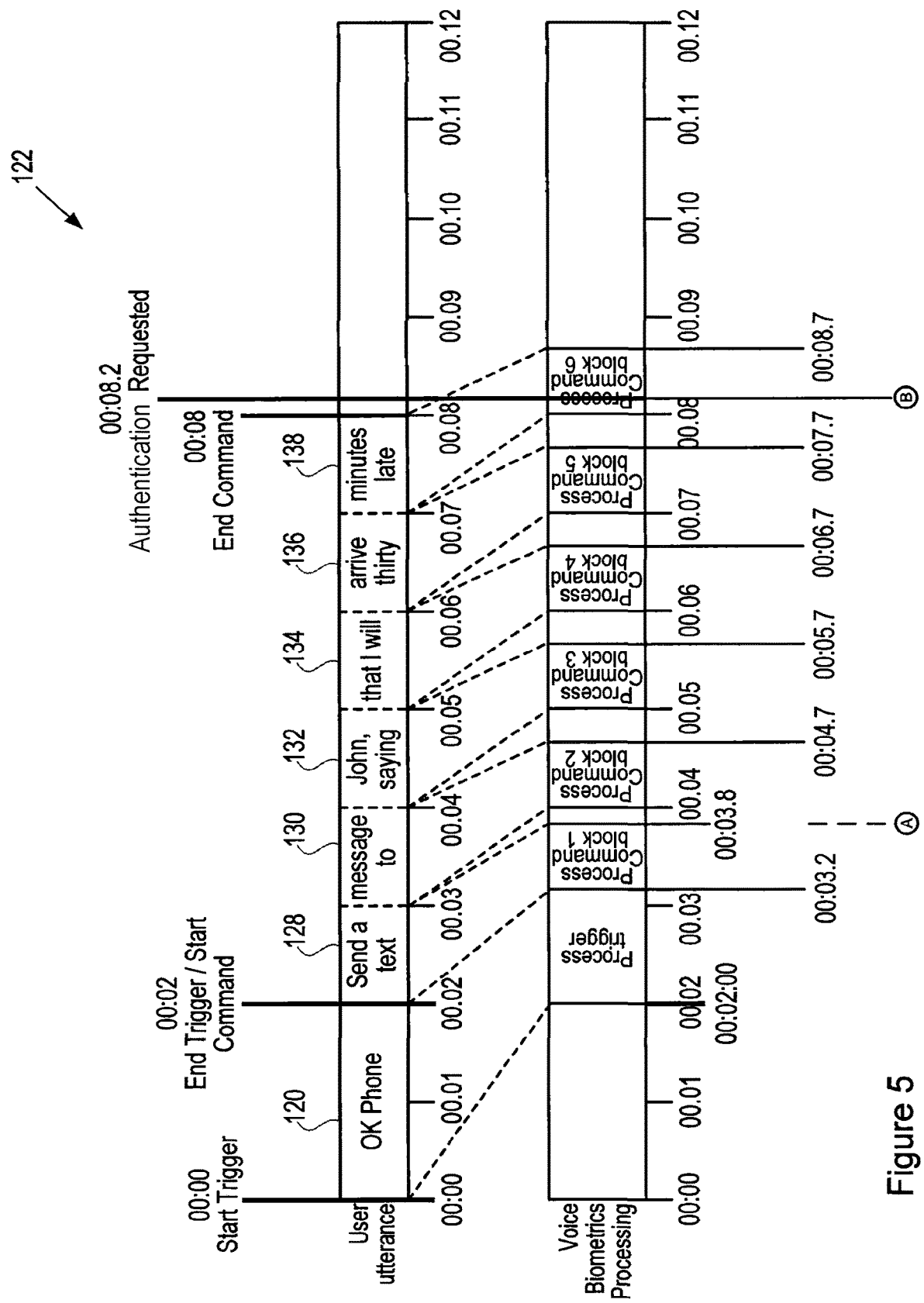
FIG. 5 is a time history, illustrating the operation of the processing system.
Figure 5:
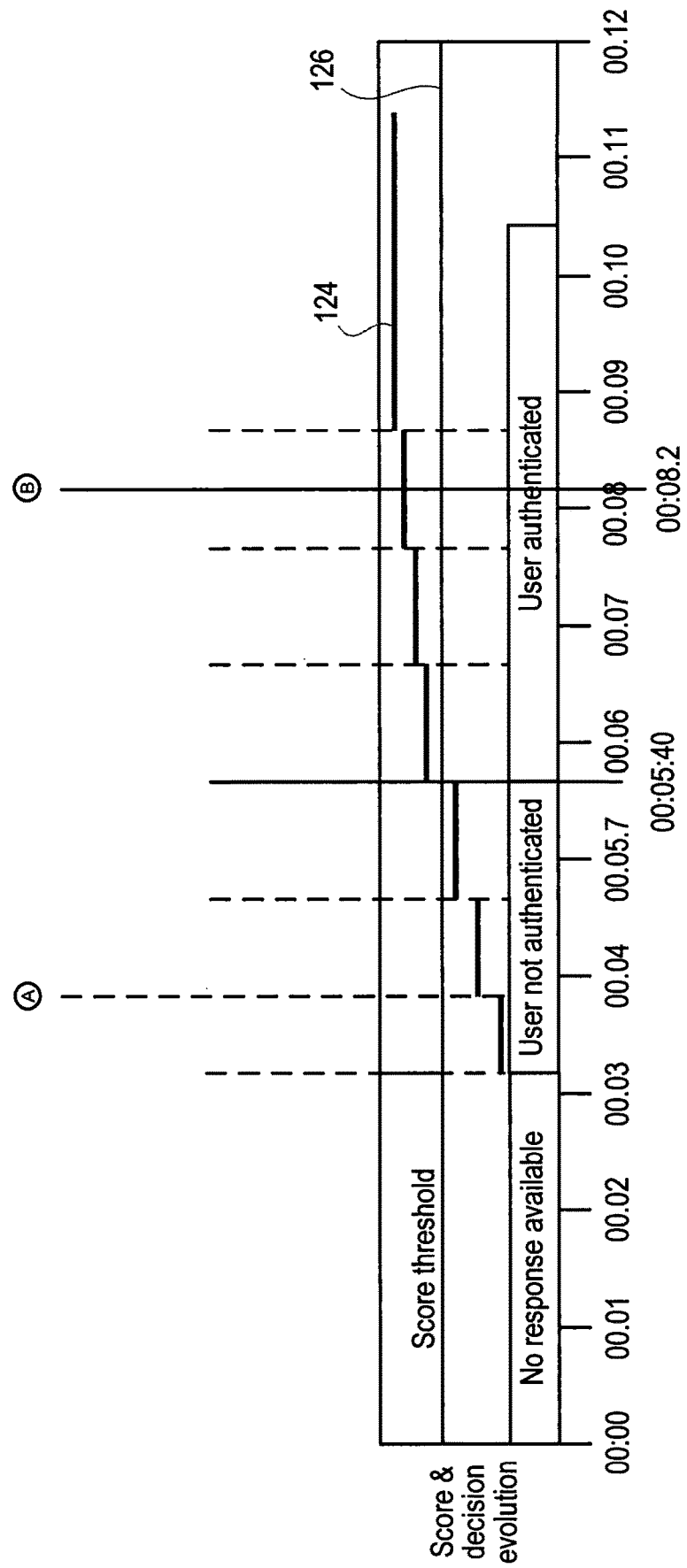

FIG. 5 is a timing diagram, illustrating the operation of the system 80, in one example.

In this example, the user utters a 2 second trigger phrase 120 ("OK Phone") followed by a 6 second command 122 ("Send a text message to John, saying that I will arrive thirty minutes late"). In other examples, the user may perform a more complex interaction with a virtual assistant system with multiple discrete sections of speech, for example selecting an item to order, and then indicating a delivery address in response to a first query from the virtual assistant, and then authorising a payment method in response to a second query from the virtual assistant. In such a case, the system excludes the speech of the virtual assistant when forming the speech segments for analysis in the voice biometrics processing.

FIG. 5 shows the times in minutes and seconds (00:00, 00:01, 00:02, . . . , 00:12) along a horizontal line below the spoken words.

FIG. 5 also shows the voice biometrics processing.

When the trigger phrase has been completed, it can be detected by a trigger detection system. In some cases the voice biometrics processing system will be activated only when the trigger is detected.

Thus, in this example, the processing of the trigger phrase by the process trigger block 86 in the voice biometrics processing system can start at the time 00:02.

The processing of a block of speech will typically take less time than the duration of the speech. Thus, in this case, the trigger phrase is processed, and the authentication score for the trigger is available at the time 00:03.2.

FIG. 5 also shows the evolution of the authentication score and of the authentication result. In this example, the authentication result is obtained by comparing the authentication score 124 with a moderately high threshold value 126.

Until the trigger phrase has been processed, there is no available authentication score, and so the system is not able to produce any authentication result.

When the trigger phrase has been processed, an authentication score will be available, but the trigger phrase contains relatively little information, and so the authentication score is not high enough to exceed the threshold, because it is not possible to be certain based on this limited information that the user is the enrolled user of the system.

Thus, the authentication result is set to "user not authenticated".

FIG. 5 shows the command phrase 122 divided into six segments 128, 130, 132, 134, 136, 138, each with a duration of 1 second.

As soon as the voice biometrics system has finished processing the trigger phrase, it processes the first segment 128 of the command. This is completed at time 00:03.8, at which point the authentication score can be updated to produce a new combined authentication score.

In this example, the updated authentication score based on the trigger and 1 second of the command does not exceed the threshold value 126. Thus, the authentication result remains set to "user not authenticated".

The voice biometrics system then processes the second segment 130 of the command. This is completed at time 00:04.7, at which point the authentication score can be updated to produce a new combined authentication score.

In this example, the updated authentication score based on the trigger and 2 seconds of the command does not exceed the threshold value 126. Thus, the authentication result remains set to "user not authenticated".

The voice biometrics system then processes the third segment 132 of the command. This is completed at time 00:05.7, at which point the authentication score can be updated to produce a new combined authentication score.

In this example, the updated authentication score based on the trigger and 3 seconds of the command does exceed the threshold value 126.

Thus, the authentication result is now set to "user authenticated". At this point, the system could push the authentication result "user authenticated" as an output, but in this case the ending condition that has been set is that the system should wait for an authentication request.

The voice biometrics system then processes the fourth segment 134 of the command. This is completed at time 00:06.7, at which point the authentication score can be updated to produce a new combined authentication score.

In this example, the updated authentication score based on the trigger and 4 seconds of the command still exceeds the threshold value 126, and so the authentication result remains set to "user authenticated".

The voice biometrics system then processes the fifth segment 136 of the command. This is completed at time 00:07.7, at which point the authentication score can be updated to produce a new combined authentication score.

In this example, the updated authentication score based on the trigger and 5 seconds of the command still exceeds the threshold value 126, and so the authentication result remains set to "user authenticated".

FIG. 5 also shows that the voice biometrics system then processes the sixth segment 138 of the command. This is completed at time 00:08.7, at which point the authentication score can be updated to produce a new combined authentication score.

In this example, the updated authentication score based on the trigger and the whole 6 seconds of the command still exceeds the threshold value 126, and so the authentication result remains set to "user authenticated".

However, FIG. 5 also shows that, in this example, authentication is requested by an external process at time 00:08.2. For example, this could happen because the external process has recognised that the command 122 has ended.

The system is able to respond immediately at time 00:08.2 with the result "user authenticated", because the updated authentication score based on the trigger and 5 seconds of the command exceeds the threshold value 126. The system is therefore able to respond with very little latency because an authentication result had previously been computed and was already available, without needing to complete the voice biometrics processing on the whole of the command.

FIG. 5 shows an example in which the authentication result may be either "user authenticated", or "user not authenticated", with the "user not authenticated" result typically being output initially, before the system has acquired enough information to authenticate the user with the required degree of certainty.

In other examples, the authentication score may be compared with a first threshold and with a second threshold. In that case, the first threshold may be set to a level that means that, when the first threshold value is exceeded, there is a high degree of certainty that the speaker is the enrolled user, and so the authentication result may indicate that the user is authenticated. The second threshold may be set to a level that means that, if the authentication score is below the second threshold, there is a high degree of certainty that the speaker is not the enrolled user. The authentication result may then indicate this. If the authentication score is between the first and second thresholds, there is uncertainty as to whether the speaker is the enrolled user, and the authentication result may indicate that the user is not yet authenticated.

Thus, the process of authenticating the speaker can be performed continuously.

The skilled person will thus recognise that some aspects of the above-described apparatus and methods, for example the calculations performed by the processor may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Embodiments of the invention may be arranged as part of an audio processing circuit, for instance an audio circuit which may be provided in a host device. A circuit according to an embodiment of the present invention may be implemented as an integrated circuit.

Embodiments may be implemented in a host device, especially a portable and/or battery powered host device such as a mobile telephone, an audio player, a video player, a PDA, a mobile computing platform such as a laptop computer or tablet and/or a games device for example. Embodiments of the invention may also be implemented wholly or partially in accessories attachable to a host device, for example in active speakers or headsets or the like. Embodiments may be implemented in other forms of device such as a remote controller device, a toy, a machine such as a robot, a home automation controller or suchlike.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of speaker authentication, comprising:
receiving a speech signal;
while the speech signal is received, dividing the speech signal into segments;
following each segment, obtaining an authentication score based on said segment and previously received segments, wherein the authentication score represents a probability that the speech signal comes from a specific registered speaker, wherein obtaining the authentication score following each segment comprises:
obtaining a first authentication score based on a first segment of the segments; and
upon receipt of each subsequent segment of the speech signal received after the first segment, obtaining a respective subsequent authentication score based on said subsequent segment and the previously received segments of the speech signal by forming a weighted sum of the first authentication score and each subsequent authentication score; and
outputting an authentication result based on the first authentication score and each subsequent authentication score in response to an authentication request;
wherein the weighted sum is formed by performing one of the following:
applying weights that depend on respective signal-to-noise ratios applicable to the respective segments; and
applying weights that depend on respective quantities of speech present in the respective segments.

2. A method according to claim 1, wherein the authentication score is obtained by comparing features of the speech signal with a model generated during enrolment of the specific registered speaker.

3. A method according to claim 1, wherein the speech signal represents multiple discrete sections of speech.

4. A method according to claim 1, wherein the first segment represents a trigger phrase, the method comprising performing the steps of obtaining the authentication score and outputting the authentication result in response to detecting that the trigger phrase has been spoken.

5. A method according to claim 4, comprising, after the trigger phrase, dividing the speech signal into segments of equal lengths.

6. A method according to claim 5, comprising, after the trigger phrase, dividing the speech signal into segments comprising equal durations of net speech.

7. A method according to claim 1, comprising comparing the authentication score with a first threshold score, and determining a positive authentication result if the authentication score exceeds the first threshold score.

8. A method according to claim 7, wherein the first threshold score is set in response to a signal received from a separate process.

9. A method according to claim 8, comprising receiving the signal from the separate process, and selecting the first threshold score from a plurality of available threshold scores.

10. A method according to claim 8, wherein the signal received from the separate process indicates a requested level of security.

11. A method according to claim 8, wherein the separate process is a speech recognition process.

12. A method according to claim 1, wherein the authentication request requests that the authentication result be output when the authentication score exceeds a threshold.

13. A method according to claim 1, wherein the step of, following each segment of the segments, obtaining an authentication score based on said segment and previously received segments comprises:
obtaining the authentication score by merging the first authentication score and each subsequent authentication score.

14. A method according to claim 13, comprising forming the weighted sum of the first authentication score and each subsequent authentication score by performing one or more of the following:
disregarding some or all outlier scores, and
disregarding low outlier scores while retaining high outlier scores.

15. A method according to claim 1, wherein the step of, following each segment of the segments, obtaining an authentication score based on said segment and previously received segments comprises:
following each subsequent segment of the speech signal, combining the subsequent segment of the speech signal with each previously received segment of the speech signal to form a new combined speech signal; and
obtaining the authentication score based on said new combined speech signal.

16. A method according to claim 1, wherein the step of, following each segment, obtaining an authentication score based on said segment and previously received segments comprises:
extracting features from each segment of the segments;
obtaining the first authentication score based on the extracted features of the first segment of the speech signal; and
following each subsequent segment of the speech signal, combining the extracted features of the subsequent segment of the speech signal with the extracted features of each previously received segment of the speech signal; and
obtaining the authentication score based on said combined extracted features.

17. A method according to claim 1, comprising, after determining a positive authentication result:
   starting a timer that runs for a predetermined period of time; and
   treating the specific registered speaker as authenticated for as long as the timer is running.

18. A non-transitory computer readable storage medium having computer-executable instructions stored thereon that, when executed by processor circuitry, cause the processor circuitry to perform a method according to claim 1.

19. A device for processing a received signal representing a user's speech, for performing speaker recognition, wherein the device is configured to:
   receive a speech signal;
   whilst the speech signal is received, divide the speech signal into segments;
      following each segment, obtain an authentication score based on said segment and previously received segments, wherein the authentication score represents a probability that the speech signal comes from a specific registered speaker, wherein obtaining the authentication score following each segment comprises:
         obtaining a first authentication score based on a first segment of the segments; and
         upon receipt of each subsequent segment of the speech signal received after the first segment, obtaining a respective subsequent authentication score based on said subsequent segment and the previously received segments of the speech signal by forming a weighted sum of the first authentication score and each subsequent authentication score; and
   output an authentication result based on the first authentication score and each subsequent authentication score in response to an authentication request;
   wherein the weighted sum is formed by performing one of the following:
      applying weights that depend on respective signal-to-noise ratios applicable to the respective segments; and
      applying weights that depend on respective quantities of speech present in the respective segments.

* * * * *